United States Patent
Kin et al.

(10) Patent No.: US 7,124,764 B2
(45) Date of Patent: Oct. 24, 2006

(54) METHOD FOR REMOVING IMPURITIES FROM POROUS MATERIALS

(75) Inventors: Kon-Tsu Kin, Hsinchu (TW); Chiou-Mei Chen, Hsinchu (TW); Pei-Lin Chang, Hsinchu (TW); Hsiao-Fen Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/023,437

(22) Filed: Dec. 29, 2004

(65) Prior Publication Data

US 2006/0137718 A1  Jun. 29, 2006

(51) Int. Cl.
*B08B 9/00* (2006.01)
(52) U.S. Cl. ............... 134/22.1; 134/22.18; 134/22.19; 134/31; 134/34; 134/35; 134/36; 134/42
(58) Field of Classification Search ............... 134/22.1, 134/22.18, 22.19, 31, 34, 35, 36, 42
See application file for complete search history.

(56) References Cited

U.S. PATENT DOCUMENTS

| | | | | |
|---|---|---|---|---|
| 6,306,754 B1 * | 10/2001 | Agarwal | ............. | 438/619 |
| 6,457,480 B1 * | 10/2002 | Cotte et al. | ............. | 134/22.1 |
| 2003/0232002 A1 * | 12/2003 | Burgin | ............. | 423/461 |
| 2004/0018452 A1 * | 1/2004 | Schilling | ............. | 430/314 |
| 2004/0057895 A1 * | 3/2004 | Burgin | ............. | 423/461 |
| 2004/0059717 A1 * | 3/2004 | Klare et al. | ............. | 707/2 |
| 2004/0087457 A1 * | 5/2004 | Korzenski et al. | ............. | 510/177 |
| 2004/0175958 A1 * | 9/2004 | Lin et al. | ............. | 438/778 |
| 2004/0211440 A1 * | 10/2004 | Wang et al. | ............. | 134/2 |
| 2004/0216772 A1 * | 11/2004 | Xu et al. | ............. | 134/36 |
| 2005/0002850 A1 * | 1/2005 | Niu et al. | ............. | 423/447.1 |
| 2005/0077597 A1 * | 4/2005 | Toma et al. | ............. | 257/629 |
| 2006/0137718 A1 * | 6/2006 | Kin et al. | ............. | 134/22.1 |

FOREIGN PATENT DOCUMENTS

JP     2003-300714    * 10/2003

* cited by examiner

*Primary Examiner*—Sharidan Carrillo
(74) *Attorney, Agent, or Firm*—Bacon & Thomas, PLLC

(57) ABSTRACT

The present invention discloses a method for removing impurities from a porous material by flowing a supercritical fluid with or without a modifier therein over a to-be-cleaned porous material having pores at the nanometer level under suitable temperatures and pressures, so that the supercritical fluid migrates into the pores at the nanometer level and removes impurities entrapped therein. The method of the present invention uses the physical and chemical properties of the supercritical fluid and optionally the modifier to clean the porous material without using an acid or alkaline solvent. The method of the present invention conserves water, and is both a highly efficient and environmentally friendly cleaning technique.

10 Claims, 1 Drawing Sheet

METHOD FOR REMOVING IMPURITIES FROM POROUS MATERIALS

BACKGROUND OF THE INVENTION

1. Field of the Invention

The present invention relates to a method for removing impurities from porous materials and, more particularly, to a method for removing impurities from a porous material at the nanometer level by utilizing a supercritical fluid.

2. Description of the Related Art

Currently, keeping component surfaces clean, and ensuring that new materials are properly purified, are important aspects to improve product yields and reliability, and have become very serious problems for high technology industries. Prior art cleaning processes include the use of acidic or alkaline solvents, strong oxidizing solvents, and organic solvents. These cleaning processes have been used for a long time and are effective, but they also are a considerable source of problems. For example, the cleaning processes invariably require huge amounts of water and chemical reagents, which often leads to product and environmental contamination, while further requiring a following drying process. However, when the components have deep channels, high aspect ratios or are made of porous media, the prior art cleaning processes cannot efficiently clean these detailed structures on the above-mentioned components, nor are they able to enter into nanometer scale holes due to the large surface tension of the prior art cleaning solvents. Therefore, there are residual contaminants and moisture after the cleaning processes. Additionally, the components must undergo a drying process after the cleaning process; however, during the drying process, the surface tension of the prior art cleaning solvent may cause pattern collapse on the components and destroy the original structure of the component, causing deteriorated characteristics. Moreover, the drying process requires a significant amount of time, which affects the following processes. Therefore, the prior art solvent cleaning processes are unsuitable for materials with complicated structures or for porous materials.

A supercritical fluid has physical properties that are between the gas phase and the liquid phase. A supercritical fluid has low viscosity (requiring less transportation power than a liquid), like a gas, a high diffusion coefficient (a diffusion coefficient 10 to 100 times higher than a liquid, which has a lower mass transfer resistance than liquid so that its mass transfer is faster than a liquid), a low surface tension (it easily penetrates into porous materials), and a high density like a liquid (thus supplying more supercritical fluid than a gas; this also increases a residence time for a fluid in a reactor, which is better adapted for a continuous operation). Not only the physical properties, but also the chemical properties of a supercritical fluid are different than the gas phase or the liquid phase. For example, the gas $CO_2$ has no extraction abilities, but supercritical $CO_2$ is lipophilic, and is able to dissolve organic material that changes with different temperature and pressure adjustments. Spent supercritical fluid can revert back to the gas phase by reducing its pressure, thereby separating from other solid and liquid phase materials, and thus can be easily recycled, which is one of the advantages of a supercritical fluid. $CO_2$ is one of most popular and important of various fluids, because its critical conditions are moderate, its critical point is easily achieved, its critical temperature is 31.2° C., which is close to room temperature, and its critical pressure is about 72.8 atm. Furthermore, $CO_2$ is not toxic, not combustible, is stable, and can be obtained from petroleum fuel combustion waste products, and so is inexpensive.

There are three patents that use supercritical fluid to remove impurities in porous low dielectric films (low k). U.S. Pat. No. 6,306,754 uses supercritical fluid to clean impurities and photoresist residuum left in a porous low dielectric film after etching; the supercritical fluid is ethane or $CO_2$, and is mixed with alcohol, ketone or a combination of the two as a modifier, and has an operating pressure of 70–200 atm and an operating temperature of 35–100° C. U.S. Pat. No. 6,669,785 uses a supercritical fluid to remove oxide, etching residuum or photoresist residuum and contaminants left in a porous low dielectric material; the supercritical fluid is $CO_2$ that includes a first fluid and a second fluid, with an operating density of 0.150 g/cc–1.1 g/cc, an operating temperature of 0–80° C., and a co-solvent that can be amine, morpholine, aniline, dibutylamine or C1–C4 alcohol in 0.1–40% w/w, and with a surfactant at a ratio of 0.1–5% w/w. U.S. No. 2004018452 uses a supercritical fluid mixed with a passivation agent to clean etching residuum left in a porous low dielectric surface material to avoid material deterioration; the supercritical fluid is $CO_2$, and the passivation agent is an acid or fluoride. After analyzing the above-mentioned patents, it is obvious that the supercritical fluid used for cleaning porous low dielectric films is primarily $CO_2$, but which requires mixing with different modifiers having different properties and proportions. The removed contaminants are primarily photoresist, photoresist residuum, etching residuum, which are organic materials. There is no patent that provides a technology to remove moisture, or that uses the same modifier to clean moisture, organic contaminants and surface modifications. For a porous low dielectric film, the etching process may cause the film material to deteriorate; moisture remaining in the apparatus can cause the dielectric constant to increase. The inability to simultaneously remove organic contaminants and moisture limits both the cleaning procedures and the development of porous materials in an integrated fabrication process.

Therefore, it is desirable to provide a method for removing impurities and moisture from porous materials to mitigate and/or obviate the aforementioned problems. Further, it has not been known using supercritical fluid to clean carbon nanotubes.

SUMMARY OF THE INVENTION

A main objective of the present invention is to provide a method for removing impurities including moisture from a porous material at the nanometer level by utilizing supercritical fluid.

Another objective of the present invention is to provide a method for removing impurities from carbon nanotubes by utilizing a supercritical fluid.

In order to achieve the above-mentioned objective, the present invention utilizes supercritical $CO_2$ and optionally a modifier under suitable temperature and pressure conditions so that the supercritical fluid migrates into the pores at the nanometer level and removes impurities entrapped therein. Since supercritical $CO_2$ has a low surface tension, a high diffusion coefficient and good solvent compatibilities, it serves as a very good carrying fluid (carrier) to evenly diffuse the added modifier into the pores at the nanometer level in the porous material. Without damaging the original characteristics and structure of the material, moisture and organic contaminants are removed from the pores. The supercritical fluid is de-pressured to atmospheric pressure, and the impurities and the modifier can be separated from the fluid without any residuum. The method of the present invention conserves water, and is a highly efficient and environmentally friendly cleaning technique. The present invention also performs analysis and verifications on the cleaned component surface and determines if the cleaned porous material retains its characteristics.

Other objects, advantages, and novel features of the invention will become more apparent from the following detailed description when taken in conjunction with the accompanying drawings.

DETAILED DESCRIPTION OF THE PREFERRED EMBODIMENT

The present invention provides a method for removing impurities including moisture from a porous material having pores at a nanometer level, the method comprising: contacting a porous material having pores or trenches at the nanometer level with a supercritical fluid, wherein impurities including moisture are in the pores or trenches, so that the supercritical fluid migrates into the pores or trenches and remove the impurities entrapped therein.

Preferably, the supercritical fluid comprises an inert gas and a modifier selected from alcohol or ketone. More preferably, the inert gas is carbon dioxide. More preferably, the modifier is selected from the group consisting of methanol, ethanol, propyl alcohol, butyl alcohol, and acetone.

Preferably, said contacting is carried out in a processing tank, and the supercritical fluid flows through the processing tank continuously. More preferably, the method of the present invention further comprises: stopping the supercritical fluid from flowing, and reducing pressure of the supercritical fluid to undergo a phase transition into gas, and removing the porous material from the processing tank.

Preferably, the porous material comprises carbon nanotubes.

Preferably, the supercritical fluid has a temperature between 40 to 80° C., a pressure between 1000 psi to 5000 psi, and a modifier having 0.5 to 15% by volume of the supercritical fluid.

Preferably, said contacting lasts for 1 minute to 60 minutes.

Figure 1:
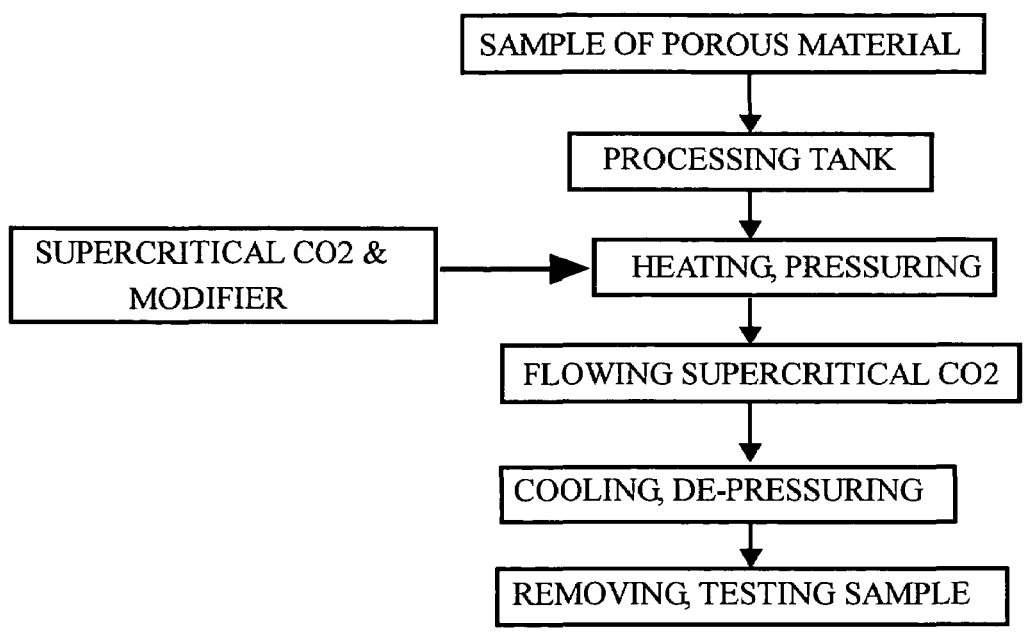
FIG. 1 is a flowchart of a preferred embodiment according to the present invention.

Please refer to FIG. 1. FIG. 1 is a flowchart of a preferred embodiment according to the present invention.

Liquid $CO_2$ is subjected to a heating and compression process to obtain a predetermined supercritical fluid. The supercritical fluid is sent to an isothermally-controlled processing tank at a fixed flow rate. Before the supercritical $CO_2$ is sent into the processing tank, a modifier at a fixed volume ratio (a fixed flow rate) is added to the supercritical $CO_2$ fluid. The resulting supercritical $CO_2$ fluid/modifier is continuously introduced into the processing tank. After reaching a predetermined pressure, exhaust fluid at the same flow rate is vented from the processing tank. After a predetermined processing time, flow of the supercritical $CO_2$ fluid/modifier and the exhaust fluid are stopped. After lowering the heat and pressure in the processing tank, the sample is taken out to complete the cleaning procedures. A related characteristic analysis and verification are performed on the cleaned sample.

Example 1

A diode carbon nanotubes (CNT) field transmitter was the object undergoing cleaning. Silver electrodes were formed on a glass substrate. The silver electrodes were coated with a paste having carbon nanotubes, and sintered at high temperature (400~500° C.) to create a diode CNT field transmitter. The carbon nanotubes in this Example are provided by the Industrial Technology Research Institute of Taiwan. The finished diode CNT field transmitter was soaked in water first and then was processed in a moisture removing experiment.

The manufacturing process for the diode CNT field transmitter does not require soaking in water, but in a patterning process during the manufacturing there is contact with a wet solution (i.e. an acidic or alkali solutions), which induces acidic, alkali or moisture contaminants, leading to component electrical defects. The purpose of soaking the CNT field transmitter in water is to simulate and determine whether the supercritical fluid cleaning can remedy the electrical defects of the diode CNT field transmitter caused by a wet solution. The CNT field transmitter was soaked for over a day, until the electrical response of the component was impaired or simply disappeared. The soaked trial component was placed directly into an oven at 103° C. for 10~20 min.

A cleaning experiment was performed according to the method shown in FIG. 1, under the following conditions: a pressure of 3000 psi and a temperature of 50° C. in the processing tank. The supercritical $CO_2$ was added with 7% by volume n-propyl alcohol as a modifier. The cleaning time was 5 minutes.

Figure 2:
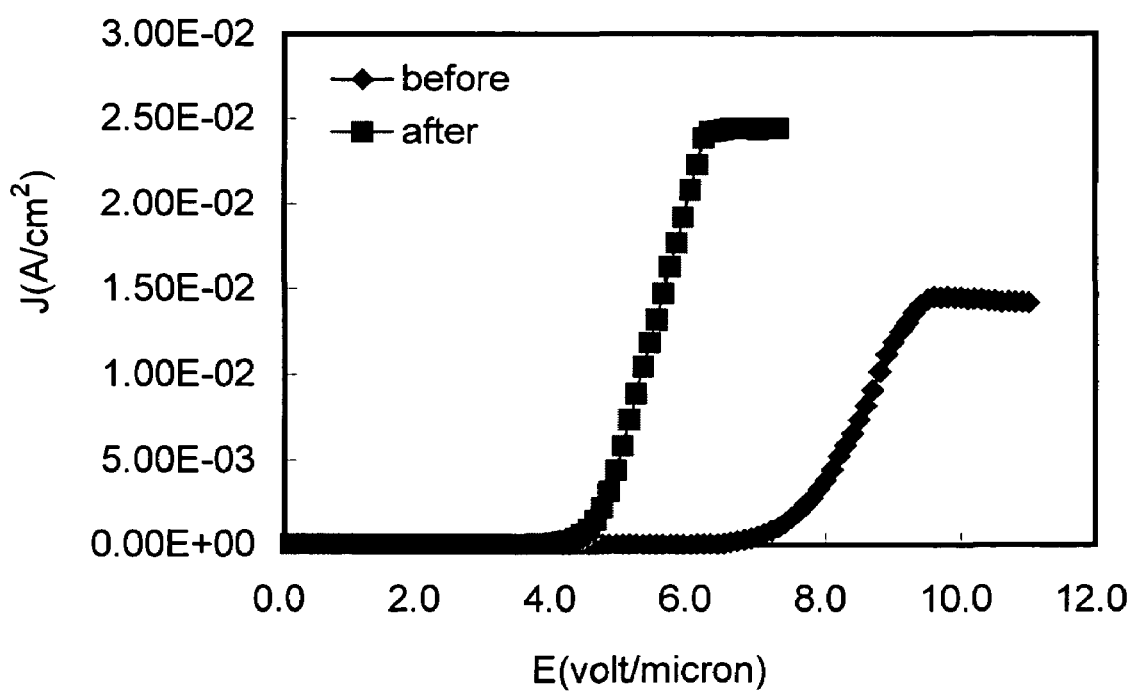
FIG. 2 shows the electrical performance of a diode CNT field transmitter before being processed (rhombus) and after being processed (square); wherein the x axis indicates an electric field strength, and the y axis indicates a current density (J) of the field transmitter.

Please refer to FIG. 2. FIG. 2 shows the electrical performance of a diode CNT field transmitter before and after processing with supercritical $CO_2$. In FIG. 2, the x-axis indicates the operating electric field, and the y-axis indicates the current density of the CNT field transmitter. The electrical field should be small to save power, and a steep curve of the current density provides for better component control. The results shown in FIG. 2 prove that the cleaned diode CNT field transmitter has a higher field emission efficiency.

The procedures in Example 1 were repeated except that the ratio of the n-propyl alcohol used was changed to 3% and 5% by volume, and cleaning results similar to FIG. 2 are observed.

Although the present invention has been explained in relation to its preferred embodiment, it is to be understood that many other possible modifications and variations can be made without departing from the spirit and scope of the invention as hereinafter claimed.

What is claimed is:

1. A method for removing impurities including moisture from a porous material having pores at a nanometer level, the method comprising: contacting a porous material deposited on a substrate with a supercritical fluid, said porous material having pores or trenches at the nanometer level, wherein said porous material comprises carbon nanotubes, and impurities including moisture are in the pores or trenches, so that the supercritical fluid migrates into the pores or trenches and remove the impurities entrapped therein, wherein said contacting is carried out in a processing tank, and the supercritical fluid flows through the processing tank continuously.

2. The method as claimed in claim 1, wherein the supercritical fluid comprises an inert gas and a modifier selected from the group consisting of alcohol or ketone.

3. The method as claimed in claim 1, further comprising: stopping the supercritical fluid from flowing, and reducing pressure of the supercritical fluid to undergo a phase transition into gas, and removing the porous material from the processing tank.

4. The method as claimed in claim 1, wherein the supercritical fluid has a temperature between 40 to 80° C., a pressure between 1000 psi to 5000 psi, and a modifier having 0.5 to 15% by volume of the supercritical fluid.

5. The method as claimed in claim 1, wherein said contacting lasts for 1 minute to 60 minutes.

6. The method as claimed in claim 2, wherein the inert gas is carbon dioxide.

7. The method as claimed in claim 2, wherein the modifier is selected from the group consisting of methanol, ethanol, propyl alcohol, butyl alcohol, and acetone.

8. The method as claimed in claim 2, wherein said modifier is added to said inert gas before said supercritical fluid is sent into said processing tank.

9. The method as claimed in claim 6, wherein the modifier is an alcohol and the alcohol is selected from the group consisting of methanol, ethanol, propyl alcohol, butyl alcohol, and acetone, the supercritical fluid has a temperature between 40 to 80° C., a pressure between 1000 psi to 5000 psi, and wherein the modifier is 0.5 to 15% by volume of the supercritical fluid, and wherein said contacting lasts for 1 minute to 60 minutes.

10. The method as claimed in claim 6 wherein the modifier is an alcohol and the alcohol is n-propyl alcohol, the supercritical fluid has a temperature of 50° C., a pressure of 3000 psi and wherein the modifier is 3–7% by volume of the supercritical fluid, and wherein said contacting lasts for 5 minutes.

* * * * *